(12) United States Patent
Zhang

(10) Patent No.: US 10,630,667 B2
(45) Date of Patent: Apr. 21, 2020

(54) CLIENT, SERVER, METHOD AND IDENTITY VERIFICATION SYSTEM

(71) Applicant: Sony Corporation, Tokyo (JP)

(72) Inventor: Zhihui Zhang, Beijing (CN)

(73) Assignee: SONY CORPORATION, Tokyo (JP)

(*) Notice: Subject to any disclaimer, the term of this patent is extended or adjusted under 35 U.S.C. 154(b) by 217 days.

(21) Appl. No.: 15/419,182

(22) Filed: Jan. 30, 2017

(65) Prior Publication Data

US 2017/0310653 A1    Oct. 26, 2017

(30) Foreign Application Priority Data

Apr. 22, 2016  (CN) .......................... 2016 1 0258499

(51) Int. Cl.
*H04L 9/32*     (2006.01)
*H04L 29/06*    (2006.01)
(Continued)

(52) U.S. Cl.
CPC .......... *H04L 63/08* (2013.01); *G06Q 20/388* (2013.01); *G06Q 20/4014* (2013.01);
(Continued)

(58) Field of Classification Search
CPC ....... H04L 63/08; H04L 63/10; H04L 9/3242; H04L 9/0637; H04L 9/0643; H04L 63/0838; G06Q 20/4014; G06Q 20/388
See application file for complete search history.

(56) References Cited

U.S. PATENT DOCUMENTS

| 2002/0004772 A1* | 1/2002 | Templeton ......... G06Q 10/0635 705/35 |
| 2005/0091492 A1* | 4/2005 | Benson .................. G06Q 20/02 713/170 |

(Continued)

FOREIGN PATENT DOCUMENTS

| KR | 101581663 B1 * | 1/2016 | |
| WO | WO-0146917 A2 * | 6/2001 | ............. G06F 21/10 |
| WO | WO-2016127721 A1 * | 8/2016 | ............. G06F 9/445 |

OTHER PUBLICATIONS

Paul Levy, "Finally, interesting uses for the blockchain that go beyond bitcoin", Dec. 4, 2015, obtained online from <http://theconversation.com/finally-interesting-uses-for-the-blockchain-that-go-beyond-bitcoin-51213>, retrieved on Oct. 28, 2018.*

*Primary Examiner* — Farid Homayounmehr
*Assistant Examiner* — Zhimei Zhu
(74) *Attorney, Agent, or Firm* — Xsensus LLP

(57) ABSTRACT

A client, a server, a method and an identity verification system are provided. The client is configured to generate a verification code and includes: a transaction initiating unit configured to initiate, in response to a predetermined identity verification event regarding a user, a random transaction between a first account and a second account in a data platform system, so that the random transaction is recorded in the data platform system; a verification code generating unit configured to generate, based on at least information about the random transaction, a verification code for verifying an identity of the user; and a sending unit configured to send the generated verification code to a server, so that the server verifies the identity of the user according to a record of the random transaction and the verification code, the data platform system being a decentralized distributed database and records therein being unchangeable and undeletable.

18 Claims, 9 Drawing Sheets

(51) Int. Cl.
  *G06Q 20/40* (2012.01)
  *G06Q 20/38* (2012.01)
  *H04L 9/06* (2006.01)

(52) U.S. Cl.
  CPC .......... *H04L 9/0637* (2013.01); *H04L 9/0643* (2013.01); *H04L 9/3228* (2013.01); *H04L 9/3242* (2013.01); *H04L 63/0838* (2013.01); *H04L 63/10* (2013.01); *H04L 9/3236* (2013.01)

(56) References Cited

U.S. PATENT DOCUMENTS

| | | | | |
|---|---|---|---|---|
| 2008/0103972 | A1* | 5/2008 | Lanc | G06Q 20/32 |
| | | | | 705/44 |
| 2013/0042111 | A1* | 2/2013 | Fiske | H04L 9/3239 |
| | | | | 713/170 |
| 2014/0108223 | A1* | 4/2014 | Xiao | G06Q 10/10 |
| | | | | 705/37 |
| 2016/0162897 | A1* | 6/2016 | Feeney | G06Q 20/4014 |
| | | | | 705/71 |
| 2016/0283920 | A1* | 9/2016 | Fisher | G06Q 20/065 |
| 2017/0098217 | A1* | 4/2017 | Studnitzer | G06Q 20/08 |
| 2017/0132626 | A1* | 5/2017 | Kennedy | G06Q 20/065 |
| 2017/0178417 | A1* | 6/2017 | Bekas | G07B 15/063 |
| 2017/0302460 | A1* | 10/2017 | Song | H04L 9/3268 |
| 2017/0302702 | A1* | 10/2017 | Hu | H04L 63/10 |
| 2018/0137512 | A1* | 5/2018 | Georgiadis | H04L 9/3239 |

* cited by examiner

CLIENT, SERVER, METHOD AND IDENTITY VERIFICATION SYSTEM

FIELD

The present disclosure relates to the field of information security, and in particular to a client and a method for generating a verification code, a server and a method for verifying an identity of a user, and an identity verification system.

BACKGROUND

An access control is a mechanism required for all computer systems, not only in a client/server system or a client/browser system, but also in a cloud system, including a simplest mechanism of user name/password, a widely used mechanism of authentication code/verification code (CAPTCHA), a currently widely used mechanism of a short message verification code or a hardware-based USB Key (Ukey) and the like. The short message verification code and the UKey both need support from an external device.

Multi-factor authentication (MFA) is an optimal practical approach for account safety which is simple and effective and can add one or more layers of safety protection in addition to the user name and the password. In terms of cryptography theory, identity authentication mainly includes three types of elements: identity authentication content which needs to be memorized by a user, such as a password or an identity card number; authentication hardware owned by the user, such as the UKey, an intelligent card (abbreviated as IC card below) or a magnetic card; and a unique characteristic of the user himself/herself, such as fingerprint, pupil, voice or the like. Each individual element is vulnerable, and if multiple elements are combined to implement the multi-element authentication, it is possible to effectively improve security of the access control of a system, which is so-called multi-factor authentication.

A verification code is one way widely applied to the multi-factor authentication currently. There are two widely used verifying ways at present. In a first way, a server and a client generate verification information synchronously; and in a second way, the server generates a verification code, and transmits the verification code to user equipment.

In the first way in which for example a random electronic token is generated by the Ukey, the server and the UKey have synchronous random number generators, and periodically generate the electronic token which randomly changes. However, in the first way, a UKey needs to be allocated to all users, and a massive random number synchronization system for all users needs to be maintained in the background, resulting in a high cost. In the second way, for example, in a way of cell phone verification code, the server generates a verification code, and transmits the verification code to a cell phone user, and then the cell phone user enters the verification code according to a prompt. However, with popularity of smart phone, vulnerabilities of a cell phone system are increasing and various Trojan horses occur, resulting in problems in security of the cell phone verification code. No matter which way is used, either the verification code is acquired synchronously by the server and the client, or the server generates the verification code and then transmits the verification code to the user, rather than the user generating the verification code initiatively prior to the server and then the server verifying the verification code in a particular condition, that is, the user cannot control verification information initiatively.

SUMMARY

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

In view of the above issues, an object of the present disclosure is to provide a client and a method for generating a verification code, a server and a method for verifying an identity of a user, and an identity verification system, in which the user dominates generation of a verification code by means of a public data platform, thereby improving security of verification.

A client for generating a verification code is provided according to an aspect of the present disclosure, the client including: a transaction initiating unit configured to initiate, in response to a predetermined identity verification event regarding a user, a random transaction between a first account and a second account in a data platform system, so that the random transaction is recorded in the data platform system; a verification code generating unit configured to generate, based on at least information about the random transaction, a verification code for verifying an identity of the user; and a sending unit configured to send the generated verification code to a server, so that the server verifies the identity of the user according to a record of the random transaction in the data platform system and the verification code, where the data platform system is a decentralized distributed database and records in the data platform system are unchangeable and undeletable.

According to a preferred embodiment of the present disclosure, the data platform system is a blockchain-based data platform.

According to another preferred embodiment of the present disclosure, the random transaction includes at least one of transfer, contract generation and asset transfer.

According to another preferred embodiment of the present disclosure, the verification code generating unit is further configured to generate the verification code based on a historical transaction record in the data platform system.

According to another preferred embodiment of the present disclosure, the first account and the second account belong to a same owner or different owners.

According to another preferred embodiment of the present disclosure, the first account and the second account are created in a real-time manner or set in advance.

According to another preferred embodiment of the present disclosure, the verification code generating unit is further configured to generate the verification code according to a predetermined generation algorithm, the predetermined generation algorithm including at least one of a Hash algorithm, a Message Authentication Code (MAC) algorithm, a Hash-based Message Authentication Code (HMAC) algorithm, a Cipher Block Chaining Message Authentication Code (CBC-MAC) algorithm, a random number generation algorithm, a public key cryptographic algorithm and a symmetric key cryptographic algorithm.

According to another preferred embodiment of the present disclosure, the client further includes a signing unit configured to sign the verification code with a private key of the client, where the sending unit is configured to send the signed verification code to the server.

A server for verifying an identity of a user is further provided according to another aspect of the present disclosure, the server including: a receiving unit configured to receive a verification code, generated by a client, for verifying the identity of the user, where the verification code is generated by the client based on at least information about a random transaction between a first account and a second account in a data platform system, the random transaction being initiated by the client in response to a predetermined identity verification event regarding the user; a retrieving unit configured to retrieve a record of the random transaction in the data platform system; and a verifying unit configured to verify validity of the verification code based on the record of the random transaction, so as to verify the identity of the user, where the data platform system is a decentralized distributed database, and records in the data platform system are unchangeable and undeletable.

An identity verification system is further provided according to another aspect of the present disclosure, the identity verification system including: a client configured to initiate, in response to a predetermined identity verification event regarding a user, a random transaction between a first account and a second account in a data platform system, so that the random transaction is recorded in the data platform system, generate, based on at least information about the random transaction, a verification code for verifying an identity of the user, and send the generated verification code to the server; the data platform system which is a decentralized distributed database and records in which are unchangeable and undeletable; and the server configured to receive the verification code, retrieve a record of the random transaction in the data platform system, and verify validity of the verification code based on the record of the random transaction to verify the identity of the user.

A method for generating a verification code is further provided according to another aspect of the present disclosure, the method including: initiating, in response to a predetermined identity verification event regarding a user, a random transaction between a first account and a second account in a data platform system, so that the random transaction is recorded in the data platform system; generating, based on at least information about the random transaction, a verification code for verifying an identity of the user; and sending the generated verification code to a server, so that the server verifies the identity of the user according to a record of the random transaction in the data platform system and the verification code, where the data platform system is a decentralized distributed database and records in the data platform system are unchangeable and undeletable.

A method for verifying an identity of a user is further provided according to another aspect of the present disclosure, the method including: receiving a verification code, generated by a client, for verifying the identity of the user, where the verification code is generated by the client based on at least information about a random transaction between a first account and a second account in a data platform system, the random transaction being initiated by the client in response to a predetermined identity verification event about the user; retrieving a record of the random transaction in the data platform system; and verifying validity of the verification code based on the record of the random transaction, so as to verify the identity of the user, where the data platform system is a decentralized distributed database, and records in the data platform system are unchangeable and undeletable.

Computer program codes and a computer program product for implementing the above methods according to the present disclosure, and a computer readable storage medium on which the computer program codes implementing the above methods according to the present disclosure are recorded are further provided according to other aspects of the present disclosure.

According to the embodiments of the present disclosure, the client dominates generation of the verification code by means of for example a blockchain-based data platform system. That is, the client initiates a random transaction in response to an identity verification event (for example, logging in a particular application service, a network payment transaction, or the like) regarding a user and generates a verification code based on at least the random transaction, and the server verifies validity and authenticity of the verification code based on a record of the transaction in the data platform system, enabling significant improvement in the information security.

Other aspects of the embodiments of the disclosure will be presented in the following detailed description serving to fully disclose preferred embodiments of the disclosure but not to limit the disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF EMBODIMENTS

Figure 1:
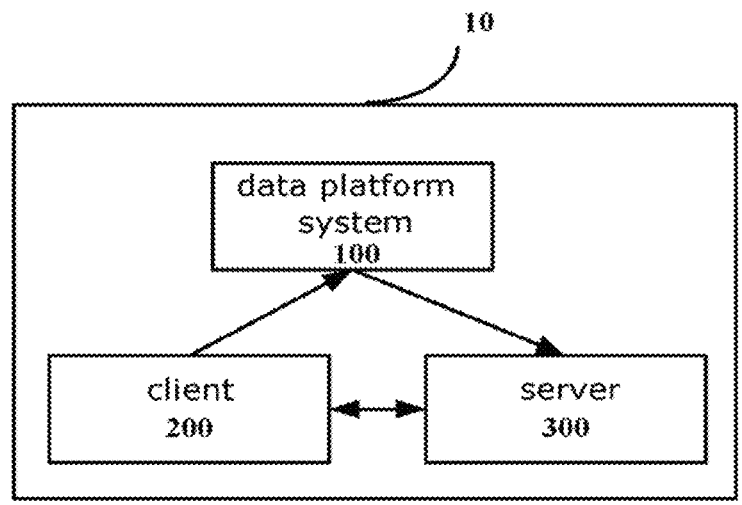
FIG. 1 is a schematic diagram illustrating a model of an identity verification system according to an embodiment of the present disclosure.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

The embodiments of the present disclosure are described below with reference to FIG. 1 to FIG. 12.

First, a model of an identity verification system according to an embodiment of the present disclosure is described with reference to FIG. 1. FIG. 1 is a schematic diagram illustrating a model of an identity verification system according to an embodiment of the present disclosure.

As shown in FIG. 1, an identity verification system 10 according to the embodiment may include a data platform system 100, a client 200 and a server 300. The client 200 is configured to generate a verification code required for verifying an identity of a user, and the server 300 is configured to verify validity of the verification code generated by the client 200 to verify the identity of the user. Hereinafter, specific functional configuration examples of the client 200 and the server 300 are described in detail with reference to FIG. 2 and FIG. 3, respectively.

The data platform system 100 is a decentralized distributed database, and records in the data platform system 100 are unchangeable and undeletable. Preferably, the data platform system may be a blockchain-based data platform.

The blockchain is a reliable distributed database system collectively maintained by all participating nodes in a decentralized and trustless way, and is characterized by its unchangeability and unforgeability. The blockchain is an important concept for a virtual currency (Bitcoin) financial system. However, with development of the blockchain technology, the blockchain is not only applied to a payment field of the virtual currency. If the blockchain technology 1.0 is created for the virtual currency, then core characteristics (that is, credit trust) of the blockchain technology 2.0 has become an important application direction currently, and the blockchain technology 2.0 is suggested to be applied to a blockchain contract and notarization. The blockchain technology 3.0 is directed to application fields besides the financial application, such as a government field, a health field, a science field, a culture field, an art field and the like.

In the blockchain technology, a large number of nodes participating in the system generate a series of data blocks with a cryptography method. Each data block includes all data about information communication in the system within a time period, generates data fingerprint which is used to verify validity of information thereof, and is chained to a next data block. The existing blockchain technology includes a permissionless blockchain, a permissioned blockchain or a combination thereof. The permissionless blockchain includes for example a Bitcoin blockchain, any person can download the permissionless blockchain, run the client of the permissionless blockchain, participate in operation and maintenance of the system, and write a new data block (that is, mining). The permissioned blockchain refers to a blockchain, writing permission (that is, mining, writing a new data block) of which is only limited to a particular organization. The combination of the permissionless blockchain and the permissioned blockchain is a blockchain a consensus process of which is controlled by a pre-selected node. Essentially, the permissionless blockchain and the permissioned blockchain have the same implementation technology, that is, a method of data storage, transmission and proof in a decentralized way and based on the distributed structure. Dependence on a central server in the internet currently is replaced with data blocks, so that all data variation or transaction items are recorded in a cloud system, which theoretically realizes self-proof for data in data transmission.

The permissionless blockchain and the permissioned blockchain share the following common aspects: a data record system (database) is implemented based on blockchain, that is, by continuously writing a new data block and chaining data records together; a consensus mechanism is required to enable all nodes to trust the new data block (for example, the consensus mechanism for Bitcoin is implemented by mining); and any node which participates in writing the new data block can reserve a complete copy of the record. A difference between the permissionless blockchain and the permissioned blockchain lies in application level, that is, which node can participate in running and maintenance (for example, mining) of the blockchain. All nodes participate in running and maintenance of the blockchain in the permissionless blockchain, while a participating node may be specified or a threshold may be set in the permissioned blockchain. Another difference is that the permissionless blockchain is anonymous, and while permissioned blockchain is not anonymous due to selectivity of the participating node in the permissioned blockchain. For example, in a bank application, only customers of a bank can participate in an blockchain-based application service of the bank, operating as one node of the application.

It should be understood that the data platform system according to the present disclosure is not limited to use the permissionless blockchain, the permissioned blockchain or the combination thereof, a suitable blockchain system may be selected according to a specific application scenario. For example, a permissioned blockchain (or referred to as a permissive blockchain) may be selected in the bank application since identity management can be introduced in the permissioned blockchain as compared with the permissionless blockchain, thereby avoiding various hidden dangers and inconvenience for user management due to complete anonymity. While for other application having no special requirements, the existing permissionless blockchain (for example, a Bitcoin blockchain system) can be used directly, thereby omitting development and maintenance cost and having better applicability. Alternatively, in some application scenarios, the combination of the permissionless blockchain and the permissioned blockchain can be selected to make a compromise between the identity management and the development and maintenance cost.

It should be noted here that although the permissioned blockchain (or referred to as the permissive blockchain) is limited by permission, the permissioned blockchain is still decentralized, and does not have a unique authority. Both the permissioned blockchain and the permissionless blockchain are a database system based on the blockchain technology, which is decentralized, employs the data block as a basic dataset, and requires a consensus mechanism to complete a transaction record.

In addition, it should be noted that although an example in which the data platform system in the present disclosure is a blockchain-based data platform is described here, the present disclosure is not limited thereto. Any existing data platform or any data platform that might occur in future can be used in the present disclosure, as long as that the data platform is a decentralized distributed database and data records in the data platform are unchangeable and undeletable.

In the following description of the present disclosure, the technology according to the present disclosure is described by taking the blockchain-based data platform as an example, but it should be understood that the technology according to the present disclosure can be similarly extended to be applied to other data platform systems.

Figure 2:
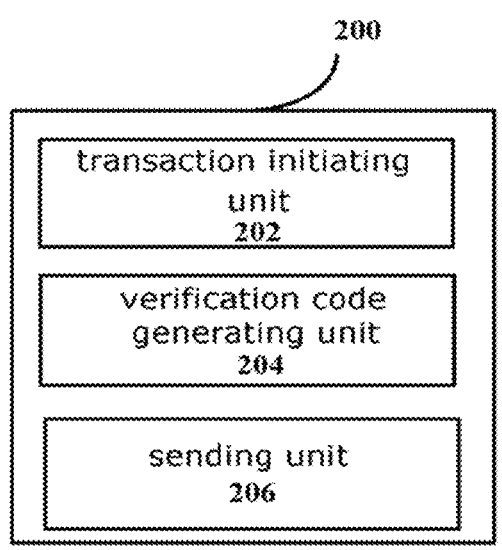
FIG. 2 is a block diagram illustrating a functional configuration example of a client for generating a verification code according to an embodiment of the present disclosure.

Next, a functional configuration example of a client for generating a verification code according to an embodiment of the present disclosure is described with reference to FIG. 2. FIG. 2 is a block diagram of a functional configuration example of a client for generating a verification code according to an embodiment of the present disclosure.

As shown in FIG. 2, the client 200 according to the embodiment may include a transaction initiating unit 202, a verification code generating unit 204 and a sending unit 206. It should be noted that the transaction initiating unit 202, the verification code generating unit 204 and the sending unit 206 may be discrete physical entities or logical entities, or may be implemented by a same physical entity (for example, a processor (for example, a central processing unit (CPU) or a digital signal processor (DSP) or the like), or an application-specific integrated circuit (ASIC) or the like). A functional configuration example of each unit is described in detail below.

The transaction initiating unit 202 may be configured to initiate, in response to a predetermined identity verification event regarding a user, a random transaction between a first account and a second account in a data platform system, so that the random transaction is recorded in the data platform system.

Figure 5:
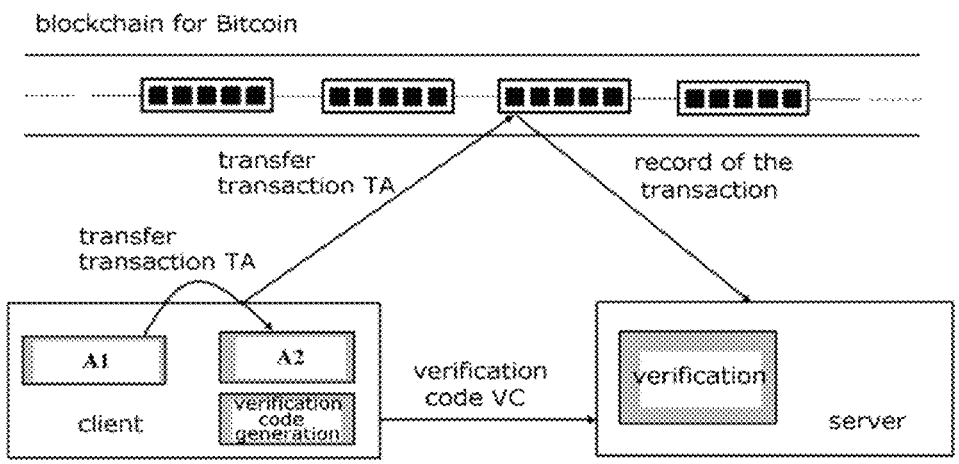
FIG. 5 is a schematic diagram illustrating application of an identity verification system according to an embodiment of the present disclosure on an existing Bitcoin blockchain system.
Figure 6:
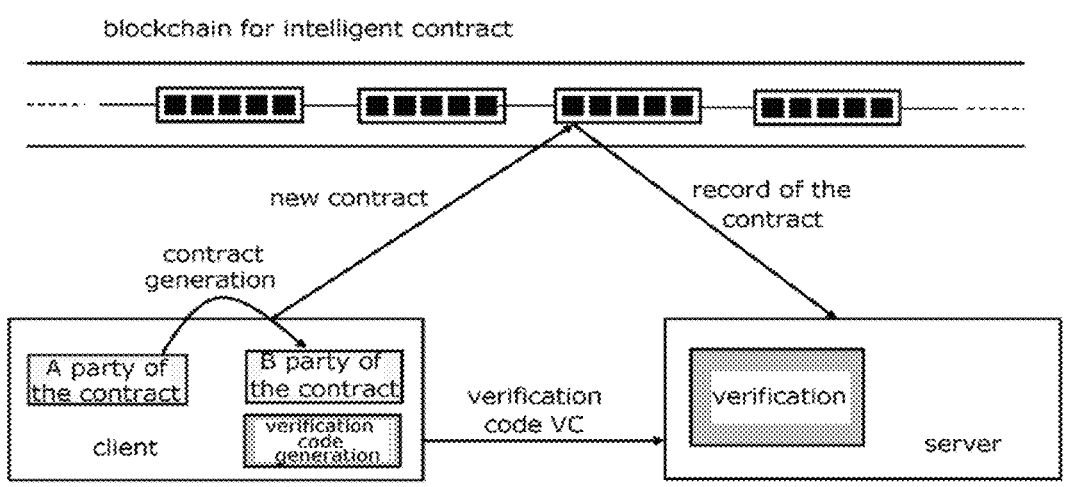
FIG. 6 is a schematic application diagram illustrating application of an identity verification system according to an embodiment of the present disclosure on an existing intelligent contract blockchain system.

Specifically, for example, when a user is to log on a specific application service, in addition to a user name and a password commonly used, a verification code is required to be entered as a factor of the multi-factor identity authentication, thereby further improving security. Different from the conventional technology in which a server and a client generate the verification code simultaneously, or the server generates the verification code and sends the verification code to the client, in the technology according to the present disclosure, the user dominates generation of the verification code using the client 200 prior to the server. For example, in a case that the data platform system is a data platform based on Bitcoin blockchain, the transaction initiating unit 202 of the client 200 may initiate a transfer transaction between a first Bitcoin account and a second Bitcoin account in the data platform system when an identity of a user is to be verified. Since the transaction is initiated by the user and a transaction amount is random, that is, no person can predict an amount and a time instant of the random transaction, the verification code cannot be forged based on information about the transaction. For example, FIG. 5 illustrates a schematic diagram of application of the technology according to the present disclosure on an existing Bitcoin blockchain system. Alternatively, in a case that the data platform system is a data platform based on intelligent contract blockchain, the transaction initiating unit 202 of the client 200 may initiate a random transaction (that is, new contract generation) between a contract party A and a contract party B in the data platform system when an identity of a user is to be verified. Similarly, since information about the new contract is unknown to other party than the user, the verification code cannot be forged based on the information about the new contract. For example, FIG. 6 illustrates a schematic diagram of application of the technology according to the present disclosure on an existing intelligent contract blockchain system. Application examples in these two cases are described later with reference to FIG. 5 and FIG. 6. Also, for example, in a case that the data platform system is a data platform based on digital asset management blockchain, the random transaction corresponds to asset transfer between a first account and a second account, and a principle thereof is similar to that of the two cases described above, which is not described repeatedly here.

It should be understood that although the transfer transaction, the intelligent contract generation and the asset transfer are described here as examples of the random transaction between the first account and the second account, the present disclosure is not limited thereto. Depending on the applied blockchain system (for example, a blockchain system based on crowd funding, a blockchain system based on legal document authentication, a blockchain system based on currency clearing and settlement, and the like), the random transaction may correspond to a transaction in the data platform system, which is not limited in the present disclosure.

The first account and the second account may belong to a same owner, for example, the two accounts may both belong to the user, or belong to an application service provider or belong to a third-party authentication service provider. Alternatively, the first account and the second account may belong to different owners, for example, the first account belongs to the user, while the second account belongs to an account specified by the application service provider or an account provided by the third-party authentication service provider. Essentially, as long as the transaction is a transaction between any two accounts operable by the client 200, data about the transaction can be used to generate a random verification code, and a process of generating the verification code is not necessarily related to the owners of the accounts. However, from the perspective of an actual business application and security, generally speaking, the user can only operate his/her own accounts or accounts specified by a service provider which are preset in the client 200.

The first account and the second account may be created in a real-time manner each time a verification code is to be generated, or may be set in advance.

Specifically, in a case that the first account and the second account are created in a real-time manner, each time a verification code is to be generated, two accounts may be created by the blockchain-based data platform system, and addresses of the two accounts are loaded into the client 200. Alternatively, the client 200 may call the blockchain-based data platform system to create two accounts. In this way, it enables the authentication server to block other operations for viciously forging an identity based on the account, which can participate in an operation, set by the user, thereby further improving security.

On the other hand, in a case that the first account and the second account are set in advance, two random accounts may be loaded in advance into the client 200 by the application service provider or a third-party authentication management service provider (the two service providers may be the same service provider). In this way, the transaction is transparent to the user, that is, when the verification code is generated, the user does not know that a transaction between two accounts in the background is involved in the process of generating the verification code.

The first account and the second account may be represented as A1 and A2, both the transaction from A1 to A2 and the transaction from A2 to A1 can be used to trigger generation of the verification code. Alternatively, the second account A2 may be specified in the client 200 by the application service provider or the third-party authentication service provider, and an account of the user may specified by the user as the first account A1, in this case, each time a verification code is to be generated, a transaction from A1 to A2 may be used to trigger the generation of the verification code.

Then, the client 200 may broadcast information about the random transaction in for example a broadcast manner, so that the random transaction is recorded in the data platform system. Since the blockchain system has non-repudiation, the random transaction is undeletable and unchangeable once being recorded in the data platform system.

The verification code generating unit 204 is configured to generate a verification code for verifying the identity of the user based on at least the information about the random transaction.

As described above, the random transaction between the first account and the second account initiated by the user happens most recently, and content information of the transaction is completely random and can not be acquired in advance and intercepted, therefore, a risk in the conventional technology that the verification code is forged, intercepted or the like can be avoided in a case that the verification code is generated based on the information about the random transaction, thereby further improving security of the verification code. Preferably, in addition to the information about the random transaction, the verification code generating unit 204 may generate the verification code based on a historical transaction record in the data platform system. It should be understood that any transaction of any account would be recorded in the blockchain-based data platform system, thus the verification code generating unit 204 may acquire historical transaction information about a known account (for example, the first account or the second account, or other known accounts than the first account and the second account) from the data platform system, to generate the verification code. In addition, the verification code generating unit 204 may further generate the verification code based on other auxiliary information (for example, a time stamp, a user name, a password and the like), which is not limited in the present disclosure, as long as a "seed" for generating the verification code includes at least information about the random transaction initiated currently.

A algorithm for generating the verification code may include at least one of a Hash algorithm, a Message Authentication Code (MAC) algorithm, a Hash-based Message Authentication Code (HMAC) algorithm, a Cipher Block Chaining Message Authentication Code (CBC-MAC) algorithm, a random number generation algorithm, a public key cryptographic algorithm and a symmetric key cryptographic algorithm, but is not limited thereto, and any well-known encryption algorithm in the art can be used. A specific process of generating the verification code based on the information about the random transaction according to the existing algorithm is similar to the process in the conventional technology, which is not described in detail here. A difference between the present disclosure and the conventional technology is that both the generated verification code and the "seed" (including at least the information about the random transaction) for generating the verification code are sent to a verifier in the conventional technology, while in the present disclosure, only the generated verification code is sent to the verifier, and the "seed" is retrieved by the verifier in the data platform system after the data platform system has confirmed the random transaction initiated by the user and the random transaction is recorded in the data platform system. The difference will be described in detail below in an embodiment regarding a server.

The sending unit 206 may be configured to send the generated verification code to the server 300, so that the server 300 verifies the identity of the user according to a record of the random transaction in the data platform system and the verification code.

Next, a functional configuration example of a server for verifying an identity of a user according to an embodiment of the present disclosure is described below with reference to FIG. 3.

Figure 3:
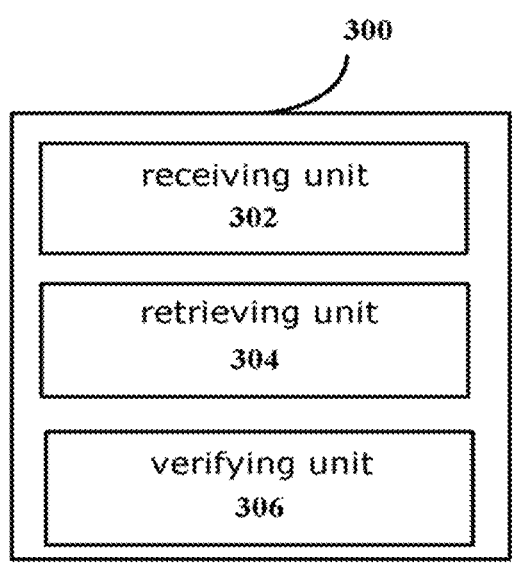
FIG. 3 is a block diagram illustrating a functional configuration example of a server for verifying an identity of a user according to an embodiment of the present disclosure.

As shown in FIG. 3, the server 300 according to the embodiment may include a receiving unit 302, a retrieving unit 304 and a verifying unit 306. It should be understood that the receiving unit 302, the retrieving unit 304 and the verifying unit 306 may be discrete physical entities or logical entities, or may be implemented by a same physical entity (for example, a processor (for example, a central processing unit (CPU) or a digital signal processor (DSP) or the like), or an application-specific integrated circuit (ASIC) or the like). A functional configuration example of each unit is described in detail below.

The receiving unit 302 is configured to receive the verification code, generated by the client 200, for verifying the identity of the user.

The retrieving unit 304 is configured to retrieve a record of the random transaction initiated by the client 200 of the user in the data platform system. That is, as described above, when the client initiates the random transaction between the first account and the second account in the data platform system to generate the verification code, the client may broadcast the random transaction in the data platform system, and the data platform system may record (that is, packaging the random transaction into a data block, and adding the data block to the blockchain) the random transaction after confirming it. Then, the retrieving unit 304 of the server 300 can find in the data platform system information about the random transaction based on an identifier of the random transaction, for verifying validity of the received verification code. It should be noted that there may be a time difference between a time instant when the client initiates the random transaction and a time instant when the server can verify the verification code uploaded by the client, and the time difference depends on a generating rate of a data block in the data platform system. Therefore, as described above, a data platform system based on the permissioned blockchain may be used for an application having a relatively high requirement for real-time performance, since a data block is generated at a relatively higher rate in the permissioned blockchain.

In addition, it should be noted that after the random transaction is recorded in the data platform system 100, the retrieving unit 304 of the server 300 may retrieve at a preset time interval (for example, the time interval depends on the generating rate of the data block in the data platform system). Alternatively, the data platform system 100 may notify the server that the random transaction has been recorded in a broadcast manner or with a dedicated notification mechanism, and the retrieving unit 304 can retrieve, upon receiving the notification, the record of the random transaction in the data platform system 100 based on identification information about the random transaction from the client 200.

The verifying unit 306 is configured to verify validity of the received verification code based on the retrieved record of the random transaction, so as to verify the identity of the user. A verification algorithm for the verification code used by the verifying unit 306 may be the same as the generation algorithm for the verification code used by the verification code generating unit 204 of the client 200. That is, assumed the generated verification code is VC, the verifying unit 306 may calculate a verification code VC' based on the retrieved record of the random transaction according to the same verification code generation algorithm, and the verification is passed in a case of VC'=VC.

As described above, in a case that the verification unit 306 verifies the validity of the received verification code according to the existing encryption algorithm described above, a specific process of generating the verification code in the present disclosure is similar to the process in the conventional technology, and a difference is that the "seed" for generating the verification code is not received from the client, but is retrieved by the server from the data platform system. That is, before the data platform system confirms and records the latest random transaction, the server cannot verity the validity and authenticity of the verification code. As described above, since the data platform system is a decentralized distributed database and records in the data platform system are unchangeable and undeletable, that is, the records in the data platform system are tamper-resistant and reliable, the "seed" related to the random transaction is generated and recorded by the data platform system, which avoids a risk of transmitting the "seed" to the server from the client, thereby further improving security of the system. In addition, the server only confirms the verification code for which the "seed" is recorded in the data platform system, that is, the data platform system serves as a buffer prior to the server. In a case that a Denial of Service (DoS) attack for the verification code is performed on the server, an attacker has to make the number of verification codes or "seeds" greatly exceed a processing ability of the server. Therefore, security of the whole application system can be further improved based on the data platform system.

Figure 4:
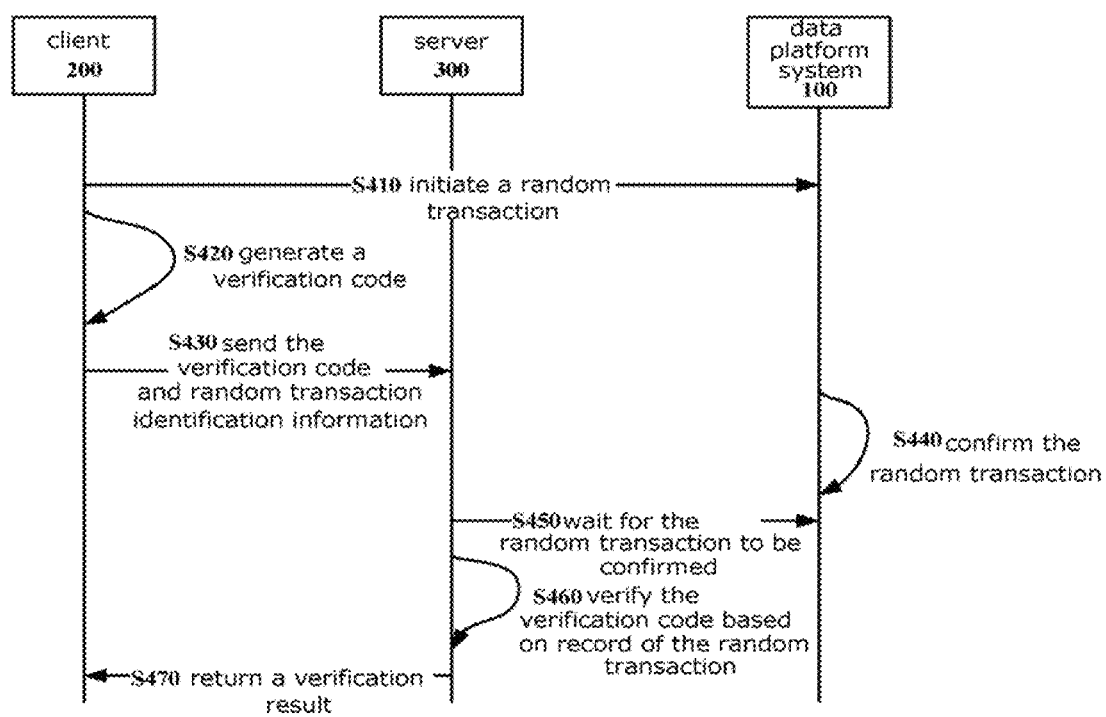
FIG. 4 is a flow diagram illustrating an interaction process for verifying an identity of a user according to an embodiment of the present disclosure.

In order to facilitate understanding of an operation flow of the verification system according to the present disclosure, the operation flow of the verification system according to the present disclosure is described below with reference to the flow diagram shown in FIG. 4. FIG. 4 is a flow diagram illustrating an interaction process for verifying an identity of a user according to an embodiment of the present disclosure.

As shown in FIG. 4, first, in step S410, the client 200 initiates a random transaction between two accounts in the data platform system 100 in response to a predetermined identity verification event (for example, the user logging on an application service), so that the random transaction is recorded in the data platform system 100. In step S420, the client 200 generates a verification code based on information about the random transaction. In step S430, the client 200 sends the generated verification code and identification information about the random transaction to the server 300. next, in step S440, the data platform system 100 confirms the random transaction and adds the random transaction as a data block into the blockchain. In step S450, the server 300 waits for the data platform system 100 to confirm the random transaction by waiting for a predetermined time period or by waiting for a confirmation notification from the data platform system 100. After the data platform system 100 confirms the random transaction, that is, after the random transaction is recorded in the data platform system 100, in step S460, the server 300 retrieves the random transaction in the data platform system 100 based on the received identification information, so as to verify validity and authenticity of the received verification code based on the record of the random transaction. In step S470, the server 300 returns a verification result to the client 200, so that the user who passes the verification can log on the application service successfully, otherwise, the user is rejected to log on the application service.

It should be understood that, the flow given with reference to FIG. 4 is only exemplary and is not intended to limit the present disclosure, and the exemplary flow can be modified by those skilled in the art according to the principle of the present disclosure. For example, in a case that the client 200 further generates the verification code based on a historical transaction record, the client 200 needs to acquire information about the historical transaction record from the data platform system 100. In addition, an order of the steps shown in FIG. 4 is given only for ease of description, and an actual process of executing the steps is not limited to the order, and can be changed appropriately based on actual conditions.

However, it should be noted that the blockchain is transparent principally, that is, all nodes can access the blockchain, therefore, in the present disclosure, it should be generally ensured that the verification code is generated and sent to the server, and then the random transaction corresponding to the verification code is recorded in the blockchain. In this way, even if the "seed" (that is, the random transaction) is obtained by a vicious third-party to forge a verification code, the forged verification code is queued behind the verification code to be verified, and the verification server will preferentially process the verification code to be verified queued ahead, which can reduce a risk that the verification code is forged, thereby improving security of the system. Practically, from the perspective of the data platform system based on the blockchain technology, it is difficult to forge a random transaction for generating a verification code. Each random transaction recorded in the data platform system is based on an activity between two accounts (addresses), and the server needs to retrieve the record based on information about the accounts (addresses) when verifying the verification code. Therefore, the vicious third-party also needs to forge the random transaction between two corresponding accounts (addresses) if he/she desires to forge the verification code, which is infeasible theoretically.

In addition, it should be noted that, generally, the generated verification code is sent to the server and then the random transaction corresponding to the verification code is recorded in the data platform system in the present disclosure, thus there is no worry that the vicious third-party forestalls logging on an another service interface after obtaining the verification code of the user, thereby avoiding possible verification confliction. For example, in a case that the vicious third-party steals a user name (ID), a password (PWD) and so on of the user, the vicious third-party may monitor and wait for an operation of the user. For example, in a case the vicious third-party finds that the user logs on application of Bank of China and generates a verification code, the vicious third-party will log on an application of Agricultural Bank of China by using the stolen ID and PWD of the user and the verification code obtained based on the obtained "seed" (i.e. the random transaction initiated by the user) of the verification code. In this case, if the server does not preferentially process the verification code generated when the user logs on the application of Bank of China, a confliction might occur. Practically, since the blockchain-based data platform includes account information, and the account information may be utilized too. For example, when the generated transaction or intelligent contract indicates that the transaction or the intelligent contract is used to initiate a transaction related to the Bank of China, such information can be used to generate the verification code and can be used by the server to verify a service source, thereby further improving the security.

However, in an actual application, as an alternative example, there may a case in which if particular information (for example, a transaction amount) about the random transaction is used as the "seed" for generating the verification code, other information related to the data platform system is not necessarily generated in advance, that is to say, a random transaction may be initiated after the verification code is generated. In other words, in a case that the "seed" does not relate to information about the data platform system, it is possible to first send a verification code and then initiate a random transaction. However, it should be understood that generation and verification of the verification code are less closely correlated with the data platform system in this case, thereby reducing security of the system to some extent.

Next, in order to more systematically understand an operation principle of the verification system according to the present disclosure, examples in which the technology according to the present disclosure is applied into a Bitcoin blockchain system and an intelligent contract blockchain system respectively are described with reference to FIG. 5 and FIG. 6. FIG. 5 is a schematic diagram illustrating application of an identity verification system according to an embodiment of the present disclosure on an existing Bitcoin blockchain system.

As shown in FIG. 5, when an identity of a user is to be verified, first, the client initiates a random transfer transaction between a Bitcoin account A1 and a Bitcoin account A2, and a transfer amount is random. The transaction is finally recorded in the data platform system based on Bitcoin blockchain, and is written as TA.

Then, the client generates a verification code based on information about the transaction: VC=VerificationCodeGen(TA), where VC represents the verification code, and VerificationCodeGen( ) is a function for generating the verification code. Preferably, the client can also generate the verification code based on both a current new transaction and a historical transaction record of a known account in the data platform system, for example, a historical record of the account A1 is used, which is represented as $A1._{History}$. For ease of recording, a latest historical record may be recorded and stored in a Hash chain starting from a first record, which may be represented as for example Hash($A1._{History}$), where Hash( ) represents the Hash function. Thus, the verification code is generated as follows: VC=VerificationCodeGen(TA∥Hash($A1._{History}$)). It should be understood that the historical information is not limited to the information starting from the first record, and may be transaction information during a specified time period.

Next, the client can return the generated verification code VC and identification information about TA to the server, and the generated verification code VC, the identification information about TA together with identity information such as a user name and a password are sent to the server to verify the identity of the user. The client also broadcasts the transaction TA within a service network of the data platform system, so that the transaction TA is recorded in the data platform system.

After the transaction TA is recorded in the data platform system, the server may find in the data platform system the transaction TA based on the identification information about TA, and verify the validity of the received verification code VC based on the record in the data platform system, that is, Result=Verify(VC,TA), where Result represents a verification result, and Verify( ) represents a verification function. As described above, the server can calculate a verification code according to the same verification code generation algorithm: VC'=VerificationCodeGen(TA), and the verification is passed in a case of VC'==VC, so that the user who passes the verification can log on the application service successfully.

It should be noted that, since the transaction relates to fund in the application based on the Bitcoin blockchain, it should be ensured that the user has no fund loss if the verification service is free. On the other hand, if the verification service is not free, after service charges are deducted, remaining fund should be returned to the account of the user. Specifically, in a case that both of two accounts which participate in generating the verification code belong to the user himself/herself, the user has no financial loss since the transaction is performed between accounts of the same user. In contrast, in a case that one of two accounts which participate in generating the verification code belongs to the user, while the other of the two accounts belongs to an application service provider or a third-party verification service provider, if the verification service is free, a reverse transfer transaction with respect to the random transfer transaction should be initiated after the verification is passed to restore the fund to an initial state. In other words, the verification code is generated with the user being unconscious of variation in account content. On the other hand, if the verification service is not free, the verification service provider can, after deducting service charges, return the remaining fund to an original account.

Preferably, the server 300 may further include a reverse transaction initiating unit configured to initiate a reverse transaction with respect to the random transaction initiated by the client after the verifying unit 306 completes verification of the verification code.

FIG. 6 is a schematic diagram illustrating application of the identity verification system according to an embodiment of the present disclosure on an existing intelligent contract blockchain system.

Before specifically describing the application of the present disclosure, related background of an intelligent contract is introduced simply. The intelligent contract is regarded as a representative application of the blockchain 2.0, and is a program driven by an event, having states, running on a duplicated shared ledger and being capable of keeping asset on the ledger. The intelligent contract is not only a computer program, but also a participator. The intelligent contract responds to received information, and can receive and store values and can also send information and values outwards. The program operates like a trustful person who can keep assets temporarily and execute an operation according to a pre-specified rule.

There are two venture companies involved in the intelligent contract platform currently: Ethereum and RootStock. The RootStock is an open source point-to-point intelligent contract platform, which uses the existing blockchain technology (the Bitcoin platform) and does not develop its own blockchain. The Ethereum is an independent open source digital currency and blockchain platform, which provides a developer with a platform for building and publishing an application on the blockchain.

Simply speaking, in terms of cryptology and financial technology (FinTech), the intelligent contract mentioned in the industry is an extension based on the blockchain, including from simple transfer to asset transfer and other transactions. A change in asset ownership and an asset state is restricted by an intelligent contract protocol (software) on the blockchain. It may be simply regarded that a network offers a contract to a transaction occurring on the blockchain, that is, the transaction is approved by the system and comes into effect, without requiring a third-party judgment authority, since the blockchain aims to realizing decentralization, just like the blockchain-based Bitcoin can realize currency issue and transaction without requiring a bank. The intelligent contract in the FinTech field is a computer program which is transparent to two parties of the contract and is executed strictly according to an agreement in the contract. Therefore, a process of creating a new intelligent contract is a process of generating a program which is used to execute an agreement between the two parties on the blockchain.

Practically, it should be understood that although the intelligent contract in the FinTech field is described above, the intelligent contract is not limited to be applied to the financial field, and can also be applied to any field in which two parties of a contract are limited to execute an operation according to content of the contract.

In the intelligent contract application, the blockchain verifies a contract based on information on a blockchain network. The information on the blockchain network is irreversible and time is recorded automatically, thereby ensuring security and reliability of the contract.

The application example shown in FIG. 6 is similar to the application example shown in FIG. 5, and a difference between the two application examples lies in only that, a transaction between accounts in the data platform system based on the intelligent contract blockchain is a new contract generation rather than transfer.

Specifically, as shown in FIG. 6, the client first initiates a random transaction, that is, generates a new intelligent contract, then generates a verification code (VC) based on the intelligent contract and sends the same to the server.

Then, the client broadcasts information about the new intelligent contract in the data platform system, so that the data platform system records the information in a next data block and adds a time stamp, and this record is unchangeable and non-repudiatable.

Next, the server retrieves the record of the intelligent contract corresponding to the received VC in the recorded data block, and verifies validity of the VC based on the record.

Similarly, as described above, after the verification is completed, the server can initiate a reverse transaction to perform a reverse contract generation according to actual requirements. The reverse transaction here is also to generate an intelligent contract program having content reverse to the contract content of the previous random transaction be executed. Other details not described are the same as those in the example shown in FIG. 5, which are not repeated here anymore, It should be noted that party A and party B of the contract are both located in the client in the example shown in FIG. 6, however, this merely indicates that the transaction between the two parties is initiated by the client, rather than indicating that party A and party B belong to the client. That is, party A and party B may belong to the same user or different users, like the first account and the second account described above.

In addition to examples described with reference to FIG. 5 and FIG. 6, the technology according to the present disclosure may also be applied to a data platform system based on a digital asset management blockchain, legal document authentication blockchain or the like, and the embodiments thereof are similar to the examples described with reference to FIG. 5 and FIG. 6, which are not described in detail here anymore.

It should be noted here that, the blockchain-based verification system according to the present disclosure operates on the premise that a verification service speed of each data block (or referred to as a speed of generating a new block) in the blockchain-based data platform system will not affect requirements and a verification speed for the verification code of the application service, since only the information about the transaction recorded in the data platform system can be used to verify the verification code generated by the client, and a data block of the blockchain is updated periodically, that is, the server only needs to verify the verification code related to the record of the transaction in the previous data block within one update cycle of the data block, and a verification code related to a transaction which is not recorded in the data block will not be processed. In other words, as long as a traffic processing speed at the server is faster than the update speed of the data block of the data platform system, denial of a service will not occur. From this perspective, the verification system based on the blockchain according to the present disclosure can resist attack of Denial of Service (DoS)/Distributed Denial of Service (DDoS) to some extent.

In addition, it should be further understood that the verification code generated based on one transaction may be used as one factor in the multi-factor identity authentication when the user logs, therefore, a new verification code is required every time the user logs, to ensure security of the identity verification system. In this way, it is unnecessary the disposable verification code is stored in the client and the server after the verification flow is completed, unless the verification code is needed to be used to generate a subsequent new verification code as an input parameter, and in this case, the verification code is stored temporarily and is not deleted until a new verification code is generated. Therefore, it can be seen that a large-scale background data maintenance system is not required compared to the existing verification code mechanism, thereby greatly reducing cost of the system.

On the other hand, the verification code generated based on one transaction can be used as a periodical dynamic verification code, for example, the verification code is generated once a day or once an hour and so on. During an expiration date, a same verification code for example a dynamic credit card verification code (CVV) is used multiple times in an application-layer service, and an application example thereof will be described in detail later. In this case, a dynamic verification code which is valid for a specified time period is generated according to the record of the transaction along with other information. In a case it is prompted the verification code is expired when using the verification code next time, the client may generate a new dynamic verification code at any time It should be noted that functional configurations of the client and the server described above are only exemplary but not limitation, and the functional configurations described above may be modified by those skilled in the art based on the principle of the present disclosure, for example, functional units described above can be combined, sub-combined, alternated and so on, or an additional functional unit may be added (for example, a display unit, a storage unit and so on).

Specifically, as an example, in a case that the verification code is generated according to MAC, CBC-MAC, HMAC or the public key cryptography algorithm, the generated verification code per se has certification/authentication characteristics, that is, only the client and the server have corresponding keys to generate or verify the verification code. In a case that the verification code is generated with a simple method having no certification/authentication characteristics such as the Hash algorithm or the random number generation algorithm, the security of the system is improved by using a signature based on a public key or an identity key, in order to resist forgery attack of a middleman. Specifically, for example, a pair of a public key (PK) and a private key (SK) is allocated for each client, and the client 200 may additionally include a signing unit configured to sign the generated verification code by using the private key of the client, and the sending unit may send the verification code together with the signature to the server, so that the server can verify the verification code based on the record of the transaction in the data platform system, and verify the signature based on the public key of the client to confirm that the verification code does come from the client 200 and is not forged. That is, a signature mechanism may be added in an application environment having a high security requirement, to verify an identity of a sender of the verification code, thereby improving security of the system.

Corresponding to the device embodiments described above, method embodiments are further provided according to the present disclosure.

Figure 7:
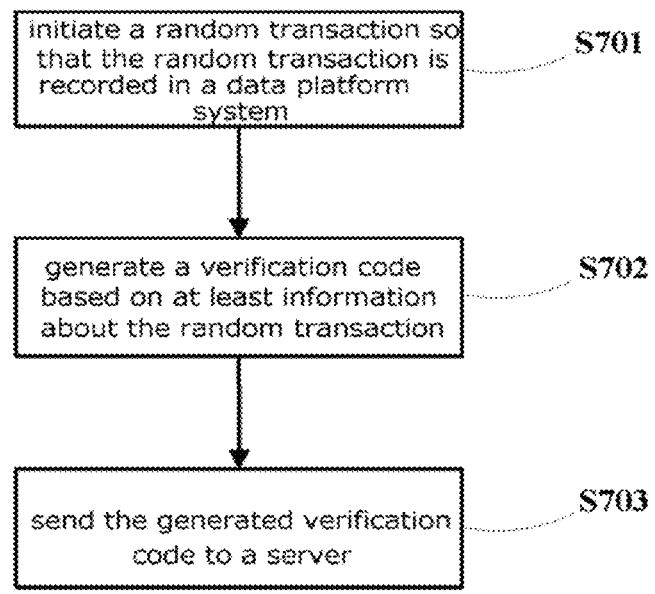
FIG. 7 is a flow diagram illustrating a process example of a method for generating a verification code according to an embodiment of the present disclosure.

FIG. 7 is a flow diagram illustrating a process example of a method for generating a verification code according to an embodiment of the present disclosure. The method can be executed by executing a program for generating the verification code on the client such as a smart phone, a tablet computer, a personal digital assistance (PDA) or the like.

As shown in FIG. 7, first, in step S701, a random transaction between a first account and a second account in a data platform system is initiated in response to a predetermined identity verification event regarding a user, so that the random transaction is recorded in the data platform system. The data platform system is a decentralized distributed database and records in the data platform system are unchangeable and undeletable. For example, preferably, the data platform system may be a blockchain-based data platform. Preferably, the random transaction includes at least one of transfer, contract generation and asset transfer. The first account and the second account may belong to a same owner or different owners, and may be created in a real-time manner or set in advance.

Next, in step S702, a verification code for verifying an identity of the user is generated based on at least information about the random transaction. Preferably, the verification code is generated further based on a historical transaction record in the data platform system.

Then, in step S703, the generated verification code is sent to a server, so that the server verifies the identity of the user according to a record of the random transaction in the data platform system and the verification code.

Preferably, the method as shown in FIG. 7 may further include a step of signing the generated verification code with a private key of the client, and in step S703, the signed verification code is sent to the server.

It should be understood that the method embodiment described here corresponds to the embodiment of the client described above with reference to FIG. 2, therefore, content which is not described in detail here may be referred to foregoing descriptions at corresponding positions and will not be repeated herein.

Figure 8:
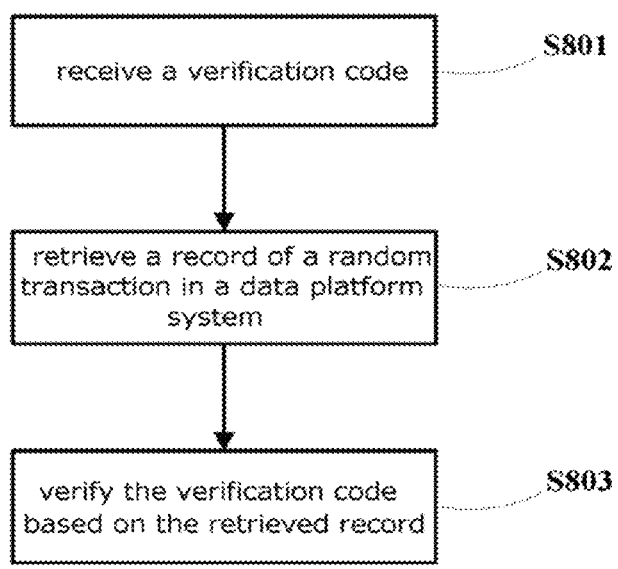
FIG. 8 is a flow diagram illustrating a process example of a method for verifying an identity of a user according to an embodiment of the present disclosure.

FIG. 8 is a flow diagram illustrating a process example of a method for verifying an identity of a user according to an embodiment of the present disclosure. The method is executed by for example executing a program for verifying the identity of the user on the server.

As shown in FIG. 8, first, in step S801, a verification code, generated by a client, for verifying an identity of a user is received. The verification code is generated by the client based on at least information about a random transaction between a first account and a second account in a data platform system, and the random transaction is initiated by the client in response to a predetermined identity verification event about the user.

Next, in step S802, a record of the random transaction is retrieved in the data platform system.

Next, in step S803, validity of the verification code is verified based on the record of the random transaction, so as to verify the identity of the user.

Preferably, the method may further include a step of initiating a reverse transaction corresponding to the random transaction after the verification.

In addition, preferably, the method may further include a step of verifying the signed verification code from the client with a public key of the client.

It should be understood that the method embodiment described here corresponds to the embodiment of the server described above with reference to FIG. 3, therefore, content which is not described in detail here may be referred to foregoing descriptions at corresponding positions and will not be repeated herein.

In addition, it should be understood that machine-executable instructions in a storage medium and a program product according to the embodiments of the present disclosure may be also configured to implement the method for generating the verification code and the method for verifying the identity of the user described above, and hence the contents which are not described in detail here may be referred to corresponding descriptions above, and are not repeated here.

Accordingly, a storage medium on which the above program product storing machine executable instructions is carried is also included in the disclosure. The storage medium includes but not limited to a floppy disk, an optical disk, a magneto-optical disk, a storage card, a memory rod and the like.

According to the embodiments of the present disclosure, the present disclosure can realize at least one of technical effects as follows.

1. An effective identity verification way is realized, and an identity of a user is verified using a blockchain-based verification code. Since the blockchain account which participates in generating the verification code belongs to the user or belongs to the client of the user like a SIM card of the user's cell phone, it is normally regarded that the generated verification code can be used in the multi-factor authentication application as information about the identity of the user without considering a vicious attack.

2. The generation of the verification code is initiated by the client, and the verification code is random. Since no person can predict specific contents and a time instant of a random transaction, a risk that the verification code is forged, intercepted or the like can be avoided effectively.

3. The verification code is verified based on data in the blockchain which is increased continuously, and a new block cannot be removed once being added to the blockchain, and the data is unchangeable and undeletable once being written. That is, the record in the data platform system is highly secure and reliable, thereby avoiding a risk in the conventional technology that data for verifying the verification code is acquired by a vicious third-party to forge the verification code, further improving the security of the system.

4. The generation of the verification code relates to a new transaction, and process security of the transaction is guaranteed by the technology of the blockchain-based data platform. The blockchain-based data platform ensures security of each section of the transaction with design of cryptography, that is, the transaction of the user cannot be forged unless information about the account of the user is leaked.

5. The Dos/DDos attack is resisted. Only information about the transaction recorded in the blockchain-based data platform can be used to verify the verification code generated by the client, and a data block of the blockchain is updated periodically, that is to say, as long as a traffic processing speed of the verification server is faster than an update speed of the data block of the blockchain-based data platform, denial of a service will not occur. Furthermore, in a case that two accounts used for generating the verification code belong to the user, the system may be designed to be triggered, by the user, to generate a verification code. For example, the user initiates the verification code generation after completing a certain calculation or an option operation. The DoS/DDoS attack can be avoided as much as possible by combining multiple means.

It can be seen that since that the verification system (including generating and verifying the verification code) according to the present disclosure greatly improves data security, it can be widely applied to various fields, including but not limited to a financial field, a medical field, a culture field, a government field, an industrial control field and the like. That is to say, the technology according to the present disclosure can be applied to any fields related to access control.

It should be noted that in the following description of the present disclosure, the client can be implemented as a physical entity device or a program running on an actual client device (for example, an intelligent terminal such as a personal computer, a smart phone, a tablet computer, a PDA or the like). Similarly, the server can be implemented as a physical entity device or a program running on an actual server device. Specifically, in a case that the client is implemented as a program, the client may be an independent software tool or service such as exe, jar, dex, APK or the like on a computer or other intelligent terminal, and may also be a software development kit such as Software development kit (SDK), Java Development Kit (JDK) or the like or a function library such as DLL, LIB or the like, which may be integrated and re-developed by a third-party software by providing an application program interface. Similarly, in a case that the server is implemented as a program, the server may be an independent software tool or service, or may be a development tool kit to be integrated into the application service system. In this case, if it is required to verify an identity of a user when the user logs on an application service, a corresponding client program may be called to generate a verification code and send the generated verification code to the server program to be verified.

Figure 9:
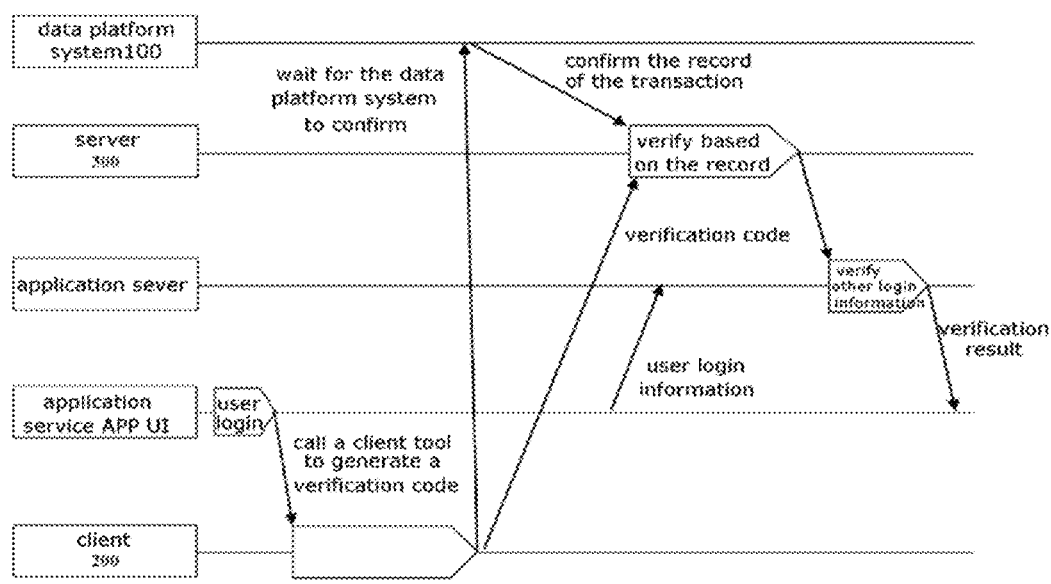
FIG. 9 is a schematic diagram illustrating an application example of the technology according to an embodiment of the present disclosure in login identity authentication of an application service environment.

Next, application examples of the technology according to the embodiments of the present disclosure in login identity authentication of an application service environment are described with reference to FIG. 9 to FIG. 11. FIG. 9 is a schematic diagram illustrating an application example of the technology according to the embodiments of the present disclosure in login identity authentication of an application service environment.

Figure 10:
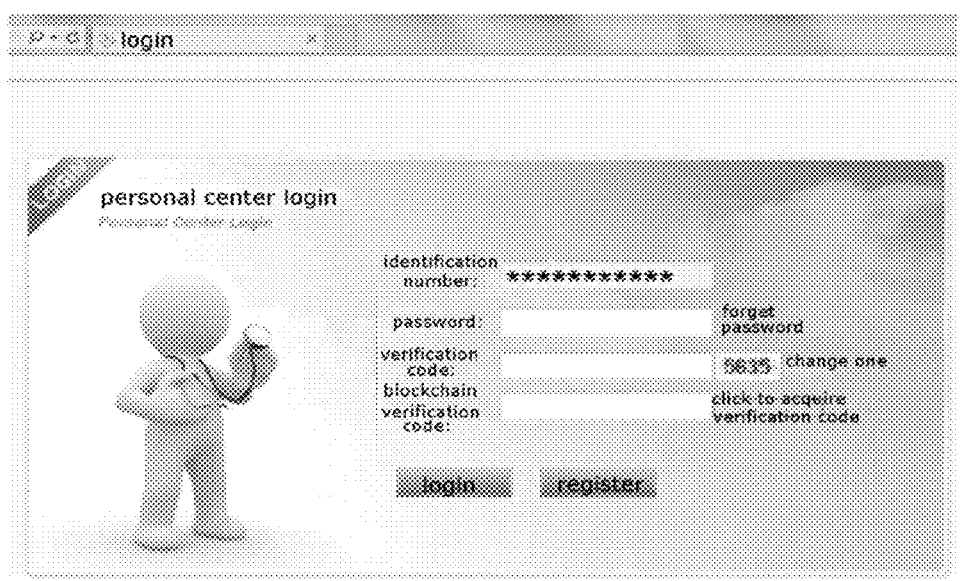
FIG. 10 is a schematic diagram illustrating a possible application interface of a verification system according to the present disclosure.

As shown in FIG. 9, an application service App UI is a user login interface when a user uses an application service, and a possible application interface is shown in FIG. 10. In the example shown in FIG. 9, a server for providing the application service and a server for providing a verification service are independent entities. Specifically, when the user logs on the application service, the client 200 may be called to generate a verification code. Then, the client 200 initiates a random transaction, generates a verification code, broadcasts the transaction so that the transaction is recorded in the data platform system 100, and sends the generated verification code and identification information about the transaction to the server 300. After the random transaction is confirmed by the data platform system 100, the server 300 verifies validity of the received verification code, and sends a verification result to the application server. The application server verifies other user login information (such as a user name and a password), and returns the verification result for the verification code and a verification result for other user login information to the application service App UI. In a case that all verification results indicate that the user passes the verification, the user can log on the application service successfully, on the other hand, in a case that any one of the verification results indicates that the user does not pass the verification, the user cannot log on the application service.

It should be understood that, the above process of generating the verification code by the client 200 and verifying the verification code by the server 300 may be executed in the background, and is completely transparent to the user. For example, as shown in FIG. 10, the user can click a button "click to acquire verification code" in the interface when a verification code is required to be generated, then the verification code generated by executing the process of generating the verification code according to the present disclosure in the background is displayed in an enter box behind the "blockchain verification code". Then, when the user clicks the button "login", authenticity of the generated verification code is verified by executing the process of verifying the verification code according to the present disclosure in the background, and the user can log on the application service if the user passes the verification, otherwise a warning message for example "verification code is wrong" may be popped up to reject the user's login of the application service. It can be seen that the specific processes of generating and verifying the verification code are transparent to the user, without requiring participation of the user, thereby not increasing operation complexity.

Figure 11:
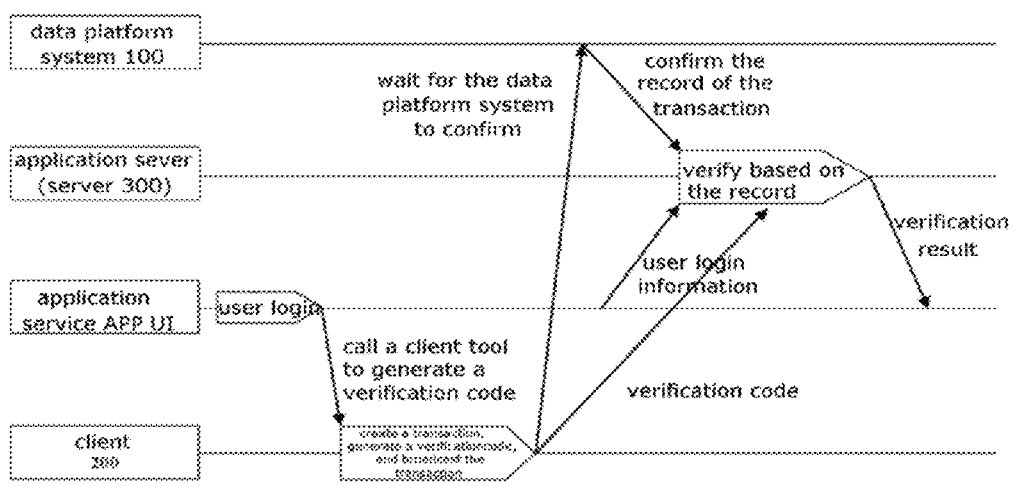
FIG. 11 is a schematic diagram illustrating another application example of the technology according to an embodiment of the present disclosure in login identity authentication of an application service environment.

FIG. 11 is a schematic diagram illustrating another application example of the technology according to the embodiments of the present disclosure in login identity authentication of a network application service environment.

As shown in FIG. 11, the application example shown in FIG. 11 is substantially the same as the application example shown in FIG. 9, a difference between the two application examples is only that, the application server and the verification server in FIG. 11 are the same entity, so that the application server can verify the verification code and other login information. Other specific process in FIG. 11 may be referred to descriptions for the example in FIG. 9, and will not be described repeatedly anymore.

An application of the technology according to the present disclosure in a credit card verification code service is described in detail below by way of an example.

With increasingly growing of network payment transaction amount, security of a credit card verification code (Card Verification Code (CVC) or Card Verification Value (CVV)) gets more attention from the bank and the client. Since the verification code is an extra code printed on the back side of the credit card, which is generally three digits, and can be remembered by any other person who sees the credit card than the user. In order to solve the security problem of CVV, a dynamic CVV technology is proposed. For example, Dynamics Inc provides a dynamic verification code solution for a client of the MasterCard, in which the dynamic verification code is displayed on a LED or a display on the card, and a random verification code is generated to be used by the user in each transaction. Practically, the solution is designed based on a displayable card, and an existing bank card having a display function generally utilizes a three-digit electronic paper (E-paper) or a LCD. The Gemalto company proposes another dynamic CVV solution, in which the previous static three-digit credit card verification code is replaced with a dynamic verification code changed every twenty minutes, and the dynamic CVV code can be implemented on a cell phone of the user, and can also be used on a card having a display module. The Tender Armor company proposes a CVVPlus product, in which the dynamic CVV is generated by a server, and is updated and pushed to a cardholder via a cell phone or email every day, or the cardholder can also apply for a new CVVPlus code at any time. It can be seen that in the existing dynamic CVV solutions, the dynamic CVV code is generated by the server, and is downloaded to the client periodically or irregularly. Alternatively, the dynamic CVV code is implemented based on a mode of generating a random number by the client and the server synchronously, in which each of the client (a cell phone or a card) and the server (a bank or a third-party) has a synchronous random number generator, to ensure that the client and the server can acquire a same verification code in a same time period. In both cases, a massive CVV generation system for all users is needed to be maintained by the sever.

In contrast, in a dynamic CVV application realized based on the present disclosure as described above, not only the bank card having a display function is not required, but also the massive CVV generation system is not needed to be maintained in the background, and the user initiatites generation of a dynamic CVV according to requirements, so that a dynamic CVV can be provided to the user at any time, or a dynamic CVV which is valid in a time period can be provided. Thus, cost of the system is greatly reduced while improving security. A dynamic CVV implementation according to the present disclosure is described simply below in conjunction with the technology according to the present disclosure.

In the dynamic credit card verification code application realized according to the present disclosure, the client may be an application program based on a cell phone, an application service program on a computer platform or an application service program on the other intelligent terminal, and the server is included in the bank service system. In addition, it should be noted that the blockchain on which the data platform system is based in the application example may be the permissionless chain, the permissioned chain of the bank or a combination thereof.

Assumed that the user is asked to enter a dynamic CVV in an online banking transaction, the user can activate a client program to complete a random transaction between two set accounts, and the random transaction is finally recorded in the data platform system.

Then, the client generates a three-digit verification code based on information about the transaction, and the verification code is submitted to the bank system by the user via an online banking system as a dynamic CVV of the online banking payment. The CVV can be generated based on other information about the user in addition to the information about the transaction, for example, a historical transaction record, a user account address (for example, a Wallet Address in the blockchain system), information about the credit card of the user and the like.

Next, the client program broadcasts the transaction in the data platform system, so that the transaction is recorded in the data platform system in a next cycle. After the transaction is recorded in the data platform system, the bank system can verify validity of the CVV by inquiring the record in the data platform system. If the verification is passed, it may be regarded that the merchant has acquired authorization of the user, thereby completing the payment transaction.

It should be understood that, although the application example of the present disclosure is described by taking the dynamic CVV as an example, the present disclosure is not limited thereto, and can be similarly applied to any fields requiring secure identity verification.

Furthermore, it shall be noted that the foregoing series of processes and devices can also be embodied in software and/or firmware. In the case of being embodied in software and/or firmware, a program constituting the software is installed from a storage medium or a network to a computer with a dedicated hardware structure, e.g., a general purpose personal computer 1200 illustrated in FIG. 12, which can perform various functions when various programs are installed thereon.

Figure 12:
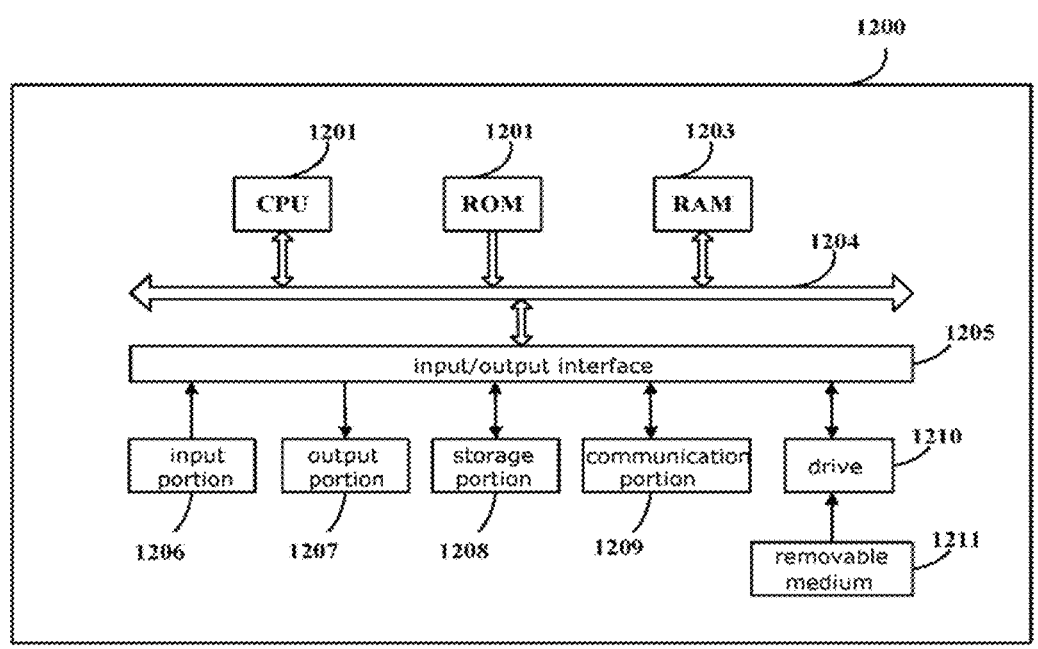
FIG. 12 is a block diagram illustrating an exemplary structure of a personal computer serving as an information processing device that may be used in an embodiment of the present disclosure.

In FIG. 12, a Central Processing Unit (CPU) 1201 performs various processes according to a program stored in a Read Only Memory (ROM) 1202 or loaded from a storage portion 1208 into a Random Access Memory (RAM) 1203 in which data required when the CPU 1201 performs the various processes is also stored as needed.

The CPU 1201, the ROM 1202 and the RANI 1203 are connected to each other via a bus 1204 to which an input/output interface 1205 is also connected.

The following components are connected to the input/output interface 1205: an input portion 1206 including a keyboard, a mouse, etc.; an output portion 1207 including a display, e.g., a Cathode Ray Tube (CRT), a Liquid Crystal Display (LCD), etc., a speaker, etc.; a storage portion 1208 including a hard disk, etc.; and a communication portion 1209 including a network interface card, e.g., an LAN card, a modem, etc. The communication portion 1209 performs a communication process over a network, e.g., the Internet.

A drive 1210 is also connected to the input/output interface 1205 as needed. A removable medium 1211, e.g., a magnetic disk, an optical disk, an magneto optical disk, a semiconductor memory, etc., can be installed on the drive 1210 as needed so that a computer program fetched therefrom can be installed into the storage portion 1208 as needed.

In the case that the foregoing series of processes are performed in software, a program constituting the software is installed from a network, e.g., the Internet, etc., or a storage medium, e.g., the removable medium 1211, etc.

Those skilled in the art shall appreciate that such a storage medium will not be limited to the removable medium 1211 illustrated in FIG. 12 in which the program is stored and which is distributed separately from the apparatus to provide a user with the program. Examples of the removable medium 1211 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1202, a hard disk included in the storage portion 1208, etc., in which the program is stored and which is distributed together with the apparatus including the same to the user.

The above series of processing steps can naturally but not necessarily be performed in the sequential order as described above chronically, and some of the steps can be performed in parallel or independently from each other.

For example, multiple functions included in one unit in the above embodiments may be implemented by separate devices. Alternatively, multiple functions implemented by multiple units in the above embodiments may be implemented by separate devices respectively. Furthermore, one of the above functions may be implemented by multiple units. Without saying, such configuration is included in the technical scope of the disclosure.

In this specification, the steps described in the flow charts include not only processes performed in the sequential order as described chronically, but also processes performed concurrently or separately but not necessarily chronically. Further, even in the steps processed chronically, without saying, the order can be appropriately changed.

Although the disclosure and the advantages thereof have been described in details, it shall be appreciated that various modifications, substitutions and variations can be made without departing from the spirit and scope of the disclosure as defined by the appended claims. Furthermore, the terms "include", "comprise" or any variants thereof in the embodiments of the disclosure are intended to encompass nonexclusive inclusion so that a process, method, article or apparatus including a series of elements includes both those elements and other elements which are not listed explicitly or an element(s) inherent to the process, method, article or apparatus. Without much more limitation, an element being defined by a sentence "include/comprise a(n) . . . " will not exclude presence of an additional identical element(s) in the process, method, article or apparatus including the element.

The invention claimed is:

1. A client for generating a verification code, comprising circuitry configured to:

initiate, in response to a predetermined identity verification event regarding a user, a random transaction between a first account and a second account in a data platform system, so that the random transaction is completed and recorded in a record in the data platform system;

generate, based on at least information about the completed random transaction, a verification code for verifying an identity of the user; and send the generated verification code to a server, so that the server verifies the identity of the user according to the record of the completed random transaction retrieved from the data platform system and the verification code, wherein the data platform system is a decentralized distributed database and records in the data platform system are unchangeable and undeletable, wherein a transaction amount of the random transaction is random, and wherein the data platform comprises a blockchain and the random transaction comprises an intelligent contract between the first account and the second account recorded on the blockchain.

2. The client according to claim 1, wherein the data platform system is a blockchain-based data platform.

3. The client according to claim 2, wherein the random transaction comprises at least one of transfer, contract generation and asset transfer.

4. The client according to claim 1, wherein the circuitry is further configured to generate the verification code based on a historical transaction record in the data platform system.

5. The client according to claim 1, wherein the first account and the second account are created in a real-time manner or set in advance.

6. The client according to claim 1, wherein the circuitry is further configured to generate the verification code according to a predetermined generation algorithm, the predetermined generation algorithm comprising at least one of a Hash algorithm, a Message Authentication Code (MAC) algorithm, a Hash-based Message Authentication Code (HMAC) algorithm, a Cipher Block Chaining Message Authentication Code (CBC-MAC) algorithm, a random number generation algorithm, a public key cryptographic algorithm and a symmetric key cryptographic algorithm.

7. The client according to claim 1, wherein the circuitry is configured to generate the verification code using a transaction amount of the completed random transaction as a seed.

8. A server for verifying an identity of a user, comprising circuitry configured to:

receive a verification code, generated by a client, for verifying the identity of the user, wherein the verification code is generated by the client based on at least information about a random transaction between a first account and a second account in a data platform system, the random transaction being initiated by the client in response to a predetermined identity verification event regarding the user, wherein the data platform system stores a record of the completed random transaction;

retrieve the record of the completed random transaction from the data platform system; and verify validity of the verification code based on the record of the completed random transaction, so as to verify the identity of the user, wherein the data platform system is a decentralized distributed database and records in the data platform system are unchangeable and undeletable, wherein a transaction amount of the random transaction is random, and wherein the data platform comprises a blockchain and the random transaction comprises an intelligent contract between the first account and the second account recorded on the blockchain.

9. The server according to claim 8, wherein the data platform system is a blockchain-based data platform.

10. The server according to claim 9, wherein the random transaction comprises at least one of transfer, contract generation and asset transfer.

11. The server according to claim 8, wherein the first account and the second account belong to a same owner or different owners.

12. The server according to claim 8, wherein the first account and the second account are created in a real-time manner or set in advance.

13. The server according to claim 8, further comprising a reverse transaction initiating unit configured to initiate, after the verification code is verified, a reverse transaction with respect to the random transaction between the first account and the second account.

14. The server according to claim 8, wherein a verification algorithm for verifying the verification code by the verifying unit is the same as a generation algorithm for generating the verification code by the client, and the verification algorithm comprises at least one of a Hash algorithm, a Message Authentication Code (MAC) algorithm, a Hash-based Message Authentication Code (HMAC) algorithm, a Cipher Block Chaining Message Authentication Code (CBC-MAC) algorithm, a random number generation algorithm, a public key cryptographic algorithm and a symmetric key cryptographic algorithm.

15. An identity verification system, comprising:
a client comprising circuitry configured to:
initiate, in response to a predetermined identity verification event regarding a user, a random transaction between a first account and a second account in a data platform system, so that the random transaction is completed and recorded in a record in the data platform system,
generate, based on at least information about the completed random transaction, a verification code for verifying an identity of the user, and
send the generated verification code to a server;
the data platform system which is a decentralized distributed database and records in which are unchangeable and undeletable; and
the server comprising circuitry configured to:
receive the verification code,
retrieve the record of the completed random transaction from the data platform system, and
verify validity of the verification code based on the record of the completed random transaction to verify the identity of the user,
wherein a transaction amount of the random transaction is random, and
wherein the data platform comprises a blockchain and the random transaction comprises an intelligent contract between the first account and the second account recorded on the blockchain.

16. The identity verification system according to claim 15, wherein the data platform system further comprises a notification mechanism configured to notify the server that the random transaction has been recorded in the data platform system.

17. A method for generating a verification code, comprising:
initiating, in response to a predetermined identity verification event regarding a user, a random transaction between a first account and a second account in a data platform system, so that the random transaction is completed and recorded in a record in the data platform system;
generating, based on at least information about the completed random transaction, a verification code for verifying an identity of the user; and
sending the generated verification code to a server, so that the server verifies the identity of the user according to the record of the completed random transaction in the data platform system and the verification code,
wherein the data platform system is a decentralized distributed database and records in the data platform system are unchangeable and undeletable,
wherein a transaction amount of the random transaction is random, and
wherein the data platform comprises a blockchain and the random transaction comprises an intelligent contract between the first account and the second account recorded on the blockchain.

18. A method for verifying an identity of a user, comprising:
receiving a verification code, generated by a client, for verifying the identity of the user, wherein the verification code is generated by the client based on at least information about a random transaction between a first account and a second account in a data platform system, the random transaction being initiated by the client in response to a predetermined identity verification event regarding the user, wherein the data platform system stores a record of the completed random transaction;
retrieving the record of the completed random transaction from the data platform system; and
verifying validity of the verification code based on the record of the completed random transaction, so as to verify the identity of the user,
wherein the data platform system is a decentralized distributed database and records in the data platform system are unchangeable and undeletable,
wherein a transaction amount of the random transaction is random, and
wherein the data platform comprises a blockchain and the random transaction comprises an intelligent contract between the first account and the second account recorded on the blockchain.

* * * * *